Aug. 28, 1973  W. N. MYERS ET AL  3,755,519
PROCESS FOR THE PREPARATION OF WEAVABLE CROSSLINKED AND
CARBON FILLED POLYOLEFIN FILAMENTS
Original Filed July 20, 1970  3 Sheets-Sheet 1

---

MOLTEN MIXTURE OF 80 TO 20% BY WEIGHT OF UNCROSSLINKED POLYOLEFIN, 20 TO 80% BY WEIGHT OF ELECTRICALLY CONDUCTIVE CARBON BLACK AND 0.01 TO 5% BY WEIGHT OF A FREE RADICAL GENERATING ORGANIC PEROXIDE.

---

SPIN SUBSTANTIALLY UNCROSSLINKED FILAMENTS

---

COOL FILAMENTS TO BELOW POLYMER MELTING POINT.

---

PASS COOLED FILAMENTS UNSUPPORTED THROUGH MICROWAVES OF $8.9 \times 10^8$ TO $1 \times 10^{12}$ CYCLES PER SECOND TO SUBSTANTIALLY CROSSLINK THEM.

---

WEAVEABLE, STATIC-DISSIPATING, CROSSLINKED FILAMENTS.

FIG. 1

*INVENTOR.*
WILLIAM N. MYERS
BY MILLER C. HAWKINS

United States Patent Office 3,755,519
Patented Aug. 28, 1973

3,755,519
PROCESS FOR THE PREPARATION OF WEAVABLE CROSSLINKED AND CARBON FILLED POLYOLEFIN FILAMENTS
William N. Meyers and Miller C. Hawkins, Raleigh, N.C., assignors to Beaunit Corporation, New York, N.Y.
Original application July 20, 1970, Ser. No. 56,255. Divided and this application Sept. 21, 1971, Ser. No. 182,407
Int. Cl. B29c 25/00
U.S. Cl. 264—26
4 Claims

ABSTRACT OF THE DISCLOSURE

Weavable, crosslinked polyolefin filaments containing therein adequate amounts of carbon black to dissipate electrostatic charges are prepared by (1) extruding substantially uncrosslinked compositions comprising from about 20 to 80 percent by weight of a polyolefin, from about 80 to 20 percent by weight of electrically conductive carbon black and small amounts of an organic peroxide to form substantially uncrosslinked filaments; (2) cooling the resulting substantially uncrosslinked filaments to a temperature below the melting point of the polyolefin; (3) supporting the cooled filaments; and thereafter (4) passing the cooled substantially uncrosslinked filaments through a field of microwaves, while said filaments are unsupported therein, for an interval during which the temperature of said filaments is raised to at least the decomposition temperature of the peroxide and to at least the melting point of the polyolefin and for a period sufficient to substantially crosslink the compositions and impart weavability thereto. Weavable, static-dissipating, crosslinked and carbon filled polyolefin filaments are obtained having a tenacity of at least 0.3 grams per denier and an elongation of at least 10 percent at break.

REFERENCE TO RELATED APPLICATION

This application is a division of our copending application, Ser. No. 56,255, filed July 20, 1970, and now abandoned, and entitled "Weavable, Crosslinked and Carbon Filled Polyolefin Filaments and a Process for the Preparation Thereof."

BACKGROUND OF THE INVENTION (1) Field of the invention

This invention relates to polyolefin filaments which are chemically crosslinked and carbon filled, and to a process for imparting weavability thereto. In particular, the invention relates to weavable, crosslinked and carbon filled polyolefin filaments and to a process which imparts weavability by crosslinking through microwave heating.

(2) Description of the prior art

The textile arts have long sought backing materials for carpet and the like which dissipate electrostatic charges developed during use, and thereby obviate the mild but unpleasant discharges often experienced by people in contact therewith.

It is now proposed that such backings be formed of weavable filaments of a polyolefin, such as polyethylene or polypropylene, containing therein adequate quantities of conductive carbon black to dissipate electrostatic charges. These filaments must be weavable; which is to say, they must possess an adequate strength of the order of at least 0.3 gram per denier, possess an adequate flexibility, and have at least 10% ultimate elongation at break to be useful for this purpose.

Until now such filaments were unavailable due mainly to the fact that polyolefins filled with adequate carbon black to dissipate electrostatic charge, say 20 to 80% by weight of the composition, were stiff, brittle and thus unweavable. Danneberg et al., J. Polymer Sci. 31, 127 (1958), reported that embrittlement may be reduced by crosslinking the polymer either by high energy gamma radiation or by the use of free-radical generating organic peroxides. Dannenberg employed thermal heating of peroxide-containing compositions to effect low rates of crosslinking at temperatures of 330 to 370° F. (186–211° C.) over intervals of 10 to 40 minutes. U.S. Pat. 2,972,780 to Boonstra improved upon the Dannenberg teaching by employing a combination of both heating by use of a high frequency alternating electric field and organic peroxides, such as dicumyl peroxide, to continuously form and crosslink extruded carbon filled polyethylene. Hollow articles, such as pipe and tubing, were obtained by extruding the composition melts essentially below the peroxide decomposition temperatures to shape them, and crosslinking them by means of dielectric heating using an alternating electric field of from $2 \times 10^6$ to $2 \times 10^8$ cycles per second while in the shaping conduit. The alternating electric field was generated between hemi-annular electrodes, insulated from one another, through which the still molten shaped polymer composition flowed. Virtually complete crosslinking occurred within one minute of dielectric heating and provided articles which were flexible enough to be coiled. Thus, the advantages provided by Boonstra were a substantial decrease in crosslinking time over Dannenberg in addition to a far more complete crosslinking, very uniform heating throughout the polymer volume, and a more uniform end product.

However, attempts to apply the Boonstra teaching in the production of continuous filaments, especially at the production rates required for commercial usage, have met with substantial difficulties. It is critical under the Boonstra teaching that the high frequency electric field treatment used to bring about crosslinking of the material be applied while the material is in the shaping passage and in contact with the boundary walls of the shaping passage. This approach can not be used to form and crosslink continuous filaments to provide useful products as desired here.

Filamentous articles are formed in the art by extruding melted thermoplastic polymer compositions through a spinneret which has a shaping passage of minute length, in the order of thousandths of an inch. Polymer melts commonly traverse such lengths in milliseconds or less in commercial practice. Boonstra requires, however, crosslinking times on the order of one minute. Further, it is physically unfeasible, as Boonstra requires, to place hemiannular dielectric electrodes about the incredibly small spinneret orifices. If this were possible, however, the strength of the electric field required to crosslink during the interval of polymer traverse would be so high as to cause arcing, excessive local heating, nonuniform physical properties, polymer degradation, discontinuities and breaks in the filaments provided.

SUMMARY OF THE INVENTION

It is to remedy the above mentioned difficulties that the present invention is directed, such remedy being an object of the invention.

Thus, an object of this invention is to provide weavable crosslinked polyolefin filaments containing therein adequate amounts of carbon black to dissipate electrostatic charges.

Another object of this invention is to provide a process for making the aforesaid filaments by uniformly heating and crosslinking polyolefin filaments containing an organic peroxide and carbon black by passing said filaments through a field of microwaves while unsupported therein.

Other desirable objects and advantages of this invention will be apparent from the detailed description thereof which follows.

According to the invention, the aforesaid objects are accomplished and weavable, crosslinked and carbon filled polyolefin filaments are obtained by the following steps:

(a) Extruding fiber-forming, substantially uncrosslinked compositions containing from about 20 to 80 percent by weight of a polyolefin, from about 80 to 20 percent by weight of electrically conductive carbon black and from about 0.01 to 5 percent by weight of an organic peroxide to form substantially uncrosslinked filaments;

(b) Cooling the substantially uncrosslinked filaments to a temperature below the melting point of the polyolefin;

(c) Supporting the cooled filaments; and thereafter (d) Passing the cooled substantial uncrosslinked filaments through a field of radio frequency electromagnetic energy waves, commonly called microwaves, having a frequency between about $8.9 \times 10^8$ and $1 \times 10^{12}$ cycles per second, and while said filaments are unsupported therein for an interval during which the temperature of said compositions is raised to at least the decomposition temperature of the peroxide which is at or above the melting point of the polymer and for a period sufficient to substantially crosslink said filaments and impart weavability thereto.

BRIEF DESCRIPTION OF THE DRAWINGS

FIG. 1 is a process flow chart indicating the process steps and conditions for carrying out the present invention.

DESCRIPTION OF THE PREFERRED EMBODIMENTS

Figure 2A:
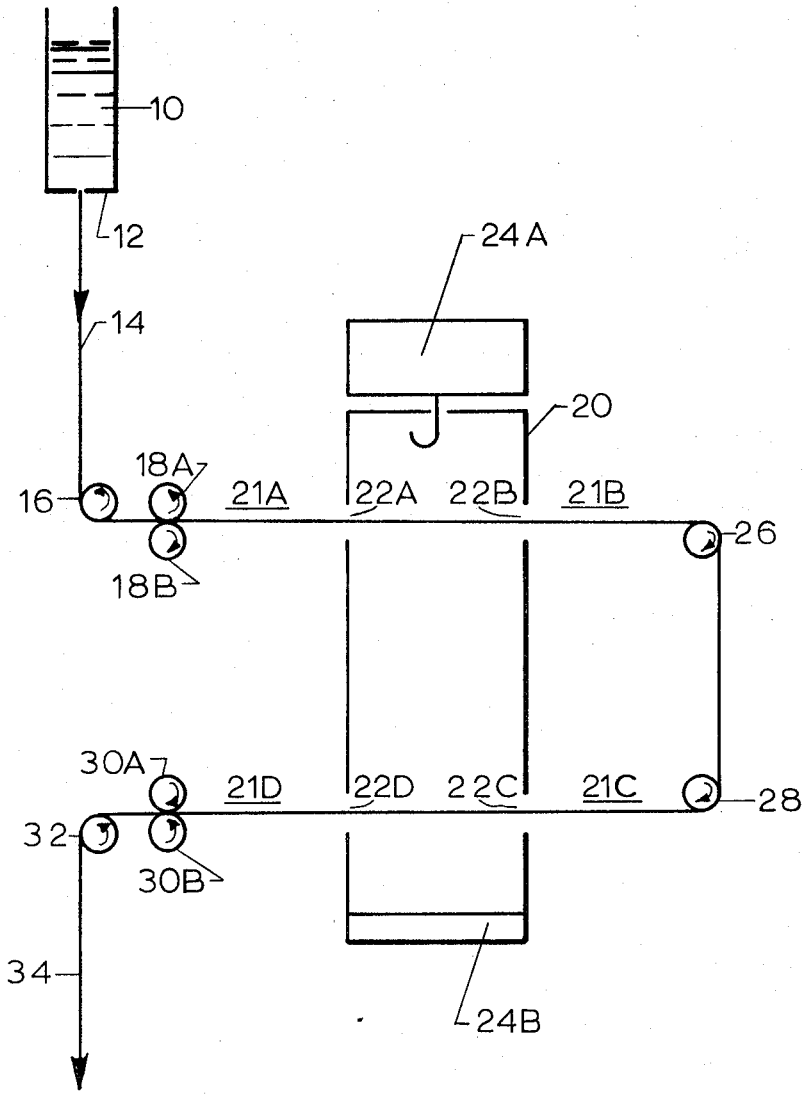
FIG. 2A is a flow chart schematically showing a preferred embodiment of the process of the present invention.
Figure 2B:
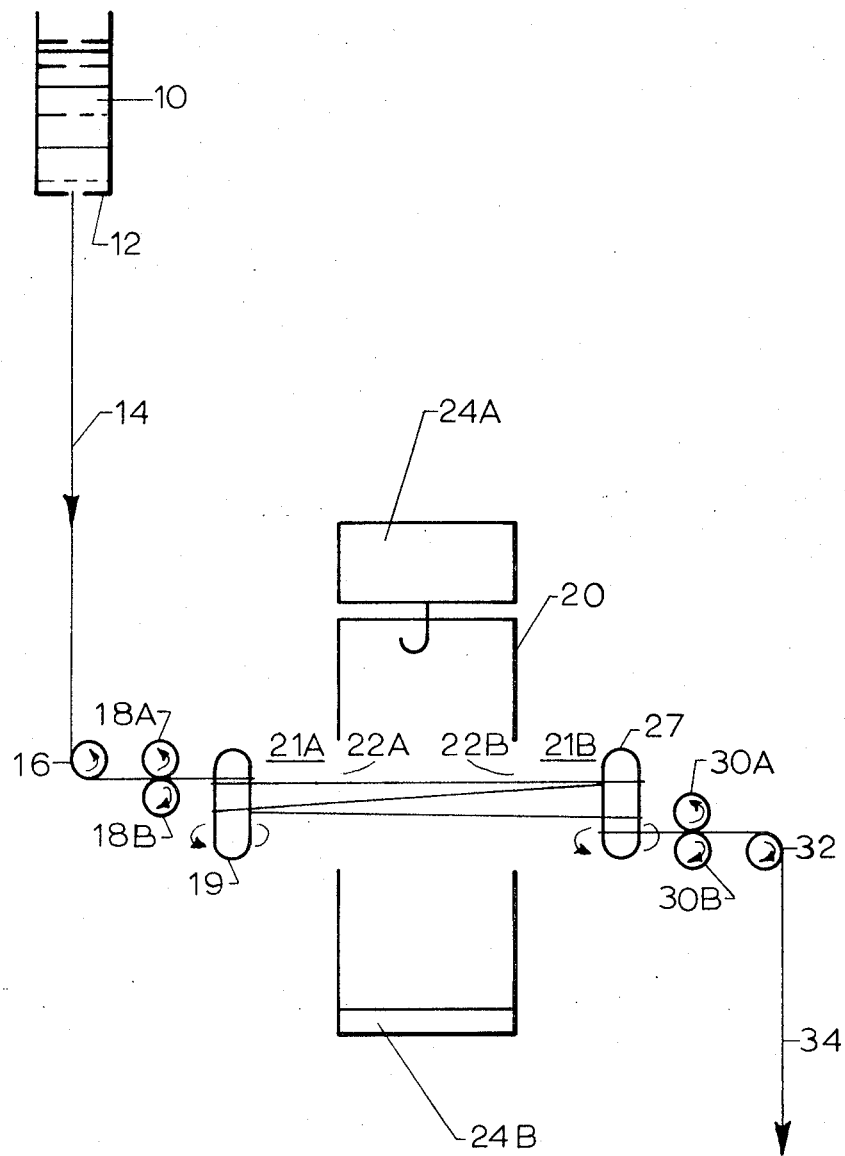
FIG. 2B is a flow chart schematically showing another preferred embodiment of the process of the present invention.

A detailed description of the present invention follows with reference to particular embodiments described in connection with FIGS. 2A and 2B. It is to be understood that the type and arrangement of apparatus and the like may be varied for the purpose of carrying out this invention. The particular embodiments as shown in FIGS. 2A and 2B are preferred.

A molten mixture 10 of a polyolefin, carbon black and an organic peroxide, maintained at a temperature and for an interval insufficient to effect crosslinking, is extruded through spinneret 12 in a conventional manner to form a substantially uncrosslinked filament 14. Filament 14 is drawn (passed) over godet roll 16 to change its direction and passed through feed rolls 18A and 18B. Between spinneret 12 and godet roll 16, filament 14 is cooled by any convenient means, such as ambient air, to a temperature below the polymer melting point so that it may pass over godet roll 16 and through feed rolls 18A and 18B without deformation. Filament 14 is then fed around godet 19 (as shown in FIG. 2B) into wave guide or microwave oven 20 through slot 22A or fed directly therein as shown in FIG. 2A. Microwaves, having a frequency of from about $8.9 \times 10^8$ to $1 \times 10^{12}$ cycles per second (c.p.s.) and preferably of from about $2.5 \times 10^9$ to $5 \times 10^9$ c.p.s., are sprayed into microwave oven or wave guide 20 from magnetron or klystron tube 24A, the excess being taken up by dummy load 24B. Filament 14, while within guide or microwave oven 20, is irradiated with microwaves and is very quickly heated to decomposition temperatures of the peroxide, thus causing crosslinking in the polyolefin. Temperatures of about 170° to 250° C. are sufficient for the purpose of this invention. The filament will, in fact, be elevated to or above the polymer melting point thereby producing some sag in its transit through the wave guide or microwave oven 20.

Rapid movement of the filament through wave guide or microwave oven 20, as may be expected in commercially useful production rates, may provide a heating interval which is insufficient to completely crosslink the filament in one passage, necessitating repassage or recycling of the filament through the wave guide or microwave oven. Intermediate to such heatings, the filament, if at or above a deformation temperature, must be recooled before repassage over the godets outside the wave guide or microwave oven. Therefore, upon exiting the wave guide or microwave oven 20 and prior to reaching godet 26 (as shown in FIG. 2A) or godet 27 (as shown in FIG. 2B), the filament, if still in a deformable state, must be cooled to a nondeformable temperature. The partially crosslinked filament may then pass around godets 26 and 28 (as shown in FIG. 2A or godet 27 (as shown in FIG. 2B) without deformation and reenter wave guide or microwave oven 20 through slot 22B or 22C respectively for reheating and further crosslinking. After sufficient passage through the wave guide or microwave oven to provide for substantially complete crosslinking, the filament may be advanced for further processing, such as weaving. Upon exiting wave guide or microwave oven 20, the substantially crosslinked filament 34 should be cooled to below its deformation temperature prior to reaching rolls 30A and 30B and subsequent take up.

The particular process steps of the present invention are critical in producing the weavable, carbon filled and crosslinked polyolefin filaments of the present invention.

Crosslinking of the molten compositions prior to spinning, by heating at or above the peroxide decomposition temperature and for a period at or exceeding the half-life of the peroxide, yield extremely viscous liquids and/or solids which are incapable of passing through the spinneret orifices to form filaments.

Heating of the just spun and uncrosslinked filaments by thermal conduction or by radiant heat produces articles which are neither sufficiently crosslinked nor flexible but are instead weak and brittle. In these cases, there is a loss of peroxide by volatilization and filaments obtained exhibit less than 0.3 gm./den. tenacity or elongation at break of less than 10% and, therefore, are unweavable.

Heating of the just spun, and still molten uncrosslinked filaments by microwaves while physically unsupported between the spinneret and the wave guide or microwave oven results in excessive necking of the filaments in an uncontrollable fashion producing crosslinked filaments with erratic denier and/or breaks or other undesirable irregularities. Repeating the aforesaid microwave treatment wherein the just spun and still molten filaments are physically supported, as by a system of godets, by a trough, or the like, deforms the still hot, plastic and deformable filaments to again yield crosslinked filaments of uncontrolled or erratic denier and/or breaks or other undesirable irregularities.

It has been found that following the process of this invention if the filaments are cooled after spinning and prior to and immediately after the microwave treatment and the cooled filaments are supported before and after microwave heating, but not while the microwave heating is taking place, then weavable and crosslinked filaments having uniform cross sectional geometry and denier and excellent electroconductive properties are obtained.

The cooling of the just spun filaments may be carried out by passing the filaments through a temperature zone somewhat less than that of the melt temperature of the composition (zones 21A, 21B, 21C and 21D of FIGS. 2A and 2B), from at least about 2 to 5° C. below the melting point of the composition. This may be done by use of a cooling chimney located just below the spinneret and into which is introduced a flow of air or other gas at a rate sufficient to effect cooling without distorting the cross sectional geometry of the still plastic filaments. Another means to provide cooling is to run the hot filaments through an inert liquid bath at a temperature below the melt temperature of the filaments. The desired cooling may be obtained by simply passing the hot filaments into air at room temperature. Choice of the particular cooling means is well within the purview of one knowledgeable in the art in order to provide the desired degree of cooling for any particular process embodiment or end use.

Upon cooling, the substantially uncrosslinked filaments are physically processable without geometric distortion and may be crosslinked using microwave heating. The mechanisms involved in the crosslinking of the polyolefin by heating with high frequency electromagnetic waves in the presence of an organic free-radical generating peroxide and carbon black is fairly well understood. It is thought that the highly energetic microwaves passing through such compositions induce internal molecular motion, frictional effects and eddy currents in the carbon black, thereby raising the temperature of the carbon black, the polymer, and the peroxide to form free radicals which interact with the polymer and create free radical crosslinking sites on the molecules thereof. At this temperature, above the melting point of the polyolefin, the polymer molecules move about and contact one another so that crosslinking sites meet and effect the desired crosslinking. Regardless of the mechanism involved in the heating and crosslinking, the use of microwaves as described herein to effect crosslinking has been found to provide filaments which are substantially crosslinked and possess adequate flexibility, ultimate elongation and ultimate tensile strength to impart weavability thereto, and adequate electroconductivity to permit a rapid dissipation of electrostatic charges in textile articles prepared therewith. The use of the microwaves in accordance with the present invention results in substantially complete crosslinking at temperatures of 170° C. to 250° C. in times of 5 to 30 seconds of irradiation as compared to times of one minute or greater as reported in prior art applications.

The products produced by the process of this invention are weavable, static-dissipating, crosslinked polyolefin filaments containing at least about 20 percent by weight of carbon black. These crosslinked carbon filled polyolefin filaments have a tenacity of at least 0.3 gram per denier and an elongation of at least 10 percent at break.

Preferably, the crosslinked carbon filled polyolefin filaments of this invention will contain from about 40 to 60 percent by weight of carbon black and have a tenacity of from about 2 to 5 grams per denier and an elongation of from about 10 to 15 percent at break.

The compositions used to prepare the weavable, crosslinked polyethylene filaments of this invention comprise from about 20 to 80 percent by weight of a polyolefin, from about 80 to 20 percent by weight of an electrically conductive carbon black and from about 0.01 to 5 percent by weight of an organic peroxide. Preferably, the composition used comprises from about 40 to 60 percent of a polyolefin, from about 60 to 40 percent by weight of an electrically conductive carbon black and from about 0.25 to 5.0 percent of an organic peroxide.

The polyolefin compositions which may be used for the purpose of this invention are those obtained by the polymerization of olefins and branched olefins containing from about 2 to 10 carbon atoms in the monomeric chain. Illustrative of suitable monomers are ethylene, propylene, 1-butene, isobutylene, 1-pentene, 4-methylpentene-1, 2-methylpentene-1, 2-butene, 2-pentene, 2-methylbutene-1, 2-methylbutene-2, 3-methylbutene-1, 3-ethylbutene-1, 1-hexene, 2-hexene, 1-heptene, 1-octene, 2-octene, and the like. Copolymers of the above-mentioned monomers may also be used for the purposes of this invention. Preferably, the polyolefin used for the purposes of this invention is polyethylene or polypropylene.

It is only necessary that the carbon black serve to provide a highly conductive filler for the polyolefin compositions. Carbon blacks are particularly desirable because of their small particle size and their high mechanical reinforcing nature.

The organic peroxides used for the purposes of this invention are free radical generating and crosslinking agents which are normally thermally active only at temperatures above those temperatures required to extrude polyolefin filaments. Organic peroxides suitable for the purposes of this invention include 2,5-dimethyl-2,5-di(t-butylperoxy) hexyne-3, benzoyl peroxide, dicumyl peroxide, t-butyl peroxide, and the like. Preferably, the organic peroxide used is 2,5-dimethyl-2,5-di(t-butylperoxy)hexyne-3.

The following examples are presented as a further disclosure and illustration of the improved process and products of this invention and are not intended as a limitation thereof. All parts, proportions, and percentages are by weight unless otherwise indicated.

EXAMPLE I

A composition comprising about 49.95 percent of high density polyethylene, about 49.95 percent of carbon black and about 0.1 percent of 2,5-dimethyl-2,5-di(t-butylperoxy) hexyne-3 (a liquid difunctional peroxide of high thermal stability sold under the tradename "Lupersol 130" by the Lucidol division of Wallace & Tiernan of Buffalo, N.Y.) was extruded through a large orifice of 0.05 inch in diameter and 1 inch in length at a temperature of about 250° C. to provide an irregular, nonuniform product which was unsuitable for use as a fiber.

The product obtained was substantially crosslinked as indicated by a broadened melting point isotherm as shown by a Differential Thermal Analysis (DTA) curve.

It was not possible to extrude the above composition at a temperature of 250° C. through a conventional spinneret having orifices of .009 inch in diameter and .012 inch in length due to the substantial crosslinking which takes place at 250° C.

EXAMPLE II

A composition as described in Example I was extruded at a temperature of about 150° C. through a conventional spinneret having orifices of .009 inch in diameter and .012 inch in length to provide suitable uniform filaments. DTA curves indicated that the filaments obtained above were essentially uncrosslinked. These filaments were found to have tenacities of about 0.3 grams/denier and elongations at break of about 1.3 percent.

EXAMPLE III

Substantially uncrosslinked filaments were prepared as described in Example II. Two and one/half inch lengths of these filaments were placed in a conventional food preparative microwave oven having a frequency of $2.45 \times 10^9$ cycles per second and a power output of 2 to 2.5 kilowatts. The filaments were supported at each end by Teflon holders and were under essentially no tension but held so that no shrinkage was allowed. These filament strips were then subjected to irradiation by high energy microwaves at a temperature greater than about 500° C. for periods up to 75 seconds. The treated filaments were uniform and non-distorted except where supported by the Teflon holders. The portions of the filament strips which were supported during the irradiation treatment were found to be non-uniform, distorted and unacceptable as commercial filament.

DTA curves indicated that the filaments were substantially crosslinked. These filaments were found to be flexible and have tenacities of about 0.45 gram/denier and elongations at break of about 30 percent. The unit of volume resistivity of these filaments were found to be about 5 ohm-centimeters.

It is to be understood that changes and variations may be made in the present invention by one skilled in the art without departing from the spirit and scope thereof as defined in the appended claims.

What is claimed is:
1. A process for the preparation of weavable, crosslinked, carbon filled polyolefin filaments which comprises:
(1) extruding fiber-forming substantially uncrosslinked compositions comprising from about 20 to 80 percent by weight of a polyolefin, from about 80 to 20 percent by weight of electrically conductive carbon black and from about 0.01 to 5 percent by weight of an organic peroxide to form substantially uncrosslinked filaments;
(2) cooling the substantially uncrosslinked filaments to a temperature below the melting point of the polyolefin;
(3) supporting the cooled filaments; and thereafter
(4) passing the cooled substantially uncrosslinked filaments through a field of radio frequency electromagnetic energy waves having a frequency between about $8.9 \times 10^8$ and $1 \times 10^{12}$ cycles per second, while said filaments are unsupported therein, for an interval during which the temperature of said filaments is raised to at least the decomposition temperature of the peroxide and to at least the melting point of the polymer and for a period sufficient to substantially crosslink said filaments and impart weavability thereto.

2. A process for the preparation of weavable, crosslinked, carbon filled polyolefin filaments which comprises:
(e) extruding fiber-forming substantially uncrosslinked compositions comprising from about 35 to 50 percent by weight of a polyolefin, from about 50 to 65 percent by weight of an electrically conductive carbon black and from about 0.25 to 5.0 percent by weight of a free radical generating organic peroxide to form substantially uncrosslinked filaments;
(2) cooling the substantially uncrosslinked filaments to a temperature below the melting point of the polyolefin;
(3) supporting the cooled filaments; and thereafter
(4) passing the cooled substantially uncrosslinked filaments through a field of radio frequency electromagnetic energy waves having a frequency between about $2.5 \times 10^9$ and $5 \times 10^9$ cycles per second, while said filaments are unsupported therein, to heat the filaments to a temperature of at least 170° C. for a period of at least 5 seconds to substantially crosslink said filaments and impart weavability thereto.

3. A process as defined in claim 2 wherein the polyolefin is polyethylene.

4. A process as defined in claim 3 wherein the polyolefin is polypropylene.

References Cited
UNITED STATES PATENTS

| | | | |
|---|---|---|---|
| 2,826,570 | 5/1958 | Ivett | 264—340 |
| 3,051,992 | 9/1962 | Bradley | 264—347 |
| 3,198,868 | 8/1965 | Pedretti et al. | 264—236 |
| 3,479,419 | 11/1969 | Hochhauser | 264—25 |
| 2,303,341 | 12/1942 | Dufour et al. | 264—26 |
| 2,888,424 | 5/1959 | Precopis et al. | 260—41 R |
| 2,948,666 | 8/1960 | Lawton | 204—159.12 |
| 2,965,553 | 12/1960 | Dixon et al. | 204—159.12 |
| 2,966,469 | 12/1960 | Smythe et al. | 264—26 |
| 3,084,114 | 4/1963 | Gilbert et al. | 204—159.12 |
| 3,372,214 | 3/1968 | Macey | 264—26 |
| 3,398,216 | 8/1968 | Petry | 264—24 |
| 3,640,913 | 2/1972 | Cerra | 264—26 |

FOREIGN PATENTS

| | | | |
|---|---|---|---|
| 1,479,149 | 5/1969 | Germany | 264—22 |

JAY H. WOO, Primary Examiner

U.S. Cl. X.R.
260—41 R; 264—211, 237